United States Patent [19]

Purcell

[11] Patent Number: 5,455,674
[45] Date of Patent: Oct. 3, 1995

[54] METHOD AND APPARATUS FOR FORENSIC EXAMINATION OF SURFACES

[75] Inventor: Francis J. Purcell, Westfield, N.J.

[73] Assignee: Instruments SA, Inc., Edison, N.J.

[21] Appl. No.: 239,937

[22] Filed: May 9, 1994

Related U.S. Application Data

[63] Continuation of Ser. No. 904,993, Jun. 26, 1992, abandoned.

[51] Int. Cl.$^6$ .................. G01J 3/18; G01N 21/64
[52] U.S. Cl. .............. 356/318; 250/458.1; 356/334
[58] Field of Search .................. 356/319, 323, 356/325, 336, 328, 331, 332, 333, 334, 71, 317, 318; 385/125; 250/458.1, 459.1, 461.1, 461.2

[56] References Cited

U.S. PATENT DOCUMENTS

| | | | |
|---|---|---|---|
| 3,775,620 | 11/1973 | Meier | 356/334 |
| 4,194,217 | 3/1980 | van den Bosch | 356/323 |
| 4,305,660 | 12/1981 | Kallet | 356/318 |
| 4,322,807 | 3/1982 | Chamran et al. | 356/319 |
| 4,371,263 | 2/1983 | Witte | 356/333 |
| 4,398,823 | 8/1983 | Brown et al. | 356/334 |
| 4,626,684 | 12/1986 | Landa | 250/461.1 |
| 4,660,974 | 4/1987 | Mächler et al. | 356/328 |
| 4,669,878 | 6/1987 | Meier | 356/334 |
| 4,696,570 | 9/1987 | Joliot et al. | 356/334 |
| 4,697,924 | 10/1987 | Akiyama | 356/334 |
| 4,747,662 | 5/1988 | Fitz | 385/125 |
| 4,933,816 | 6/1990 | Hug et al. | 362/32 |
| 4,973,159 | 11/1990 | Sohma et al. | 356/328 |
| 5,071,250 | 12/1991 | McGee | 356/328 |

*Primary Examiner*—F. L. Evans
*Attorney, Agent, or Firm*—Handal & Morofsky

[57] ABSTRACT

A method of illuminating a deposition of organic material such as, blood, sweat or oil for forensic examination is disclosed. Light having a wide range of wavelengths is generated and directed towards a reflective diffraction grating. The relative position of an exit slit with respect to the grating is adjusted to pass a desired band of wavelengths of output light from portions of the light reflected by the grating. The output light is then directed toward the deposition to be examined through the use of a fiber optic bundle, preferably a liquid fiber optic member. Adjustment of the relative position of the exit slit with respect to the grating is achieved by rotation of the grating. Movement is controlled by an electronic control and a handheld remote control pad.

9 Claims, 6 Drawing Sheets

METHOD AND APPARATUS FOR FORENSIC EXAMINATION OF SURFACES

This application is a continuation of application Ser. No. 07/904,993, filed 26 Jun. 1992, now abandoned.

TECHNICAL FIELD

The present invention relates to a method for the examination of surfaces for fingerprints, blood, hair or other foriegn material for the purpose of developing evidence relating to the past history of the surface.

BACKGROUND

Starting at the end of the nineteenth century, crime fighters began to use and develop what has grown into a substantial body of technological tools designed to detect and/or enhance physical evidence. One of the earliest techniques of this kind to receive widespread application is the dusting of fingerprints. Light sources were also among the first tools used in this field. Hence the classic icon of the gumshoe, flashlight in hand, support for evidence at the dimly lit crime scene.

When a fingerprint is fresh, the oil which forms the print generally follows the pattern of the fingerprint ridges in the finger which made the print. If a fine dust is applied to the surface of a fresh print, the dust tends to adhere to the oils in the fingerprint, thus forming a pattern which generally reveals the pattern of the fingerprint.

Fingerprint dusts were initially selected for their color contrasting qualities as compared to the background. Thus white dust was used to enhance a fingerprint on a black object and vise versa. However where the oils of a fingerprint have lost their tackiness due to aging or other phenomena, the amino acids into which they break down do cause a minute etching of many surfaces. While this etching is often not visible to the naked eye, and may not become visible with the application of a colored powder, extremely fine florescent dusting powders will reveal the fingerprint pattern when illuminated under high intensity light.

Today when florescent dusting powders are used, inspection of the evidence is done with specialized light sources. These light source usually comprise a high intensity source and a filter which passes light having a limited range of wavelengths. Depending upon the material used, which material may be either a florescent dusting powder, dye, or other marker material, light having a wavelength which substantially coincides with a known excitation frequency of the marker is employed. The characteristic of the marker is that, upon illumination with light at one of its excitation wavelengths, it will fluoresce, or emit light. Such fluorescence is typically at a wavelength different from the excitation wavelength.

Examination of evidence is also enhanced through the use of color filtering glasses or barrier filters, whose color filtering characteristics are tuned to maximize the image to be detected. As noted above, the excitation wavelength is varied through the use of filters at the source. While such devices are very efficient in filtering light, every filter has its own fixed characteristics. These include its center wavelength, bandwidth and transmission coefficient. Thus, if one wishes to have flexibility, it is necessary to have a wide range of filters having different center wavelengths and different bandwidths. This is both cumbersome and expensive. Moreover, as new dyes and powders are introduced, old filters can become obsolete or unnecessary.

In an attempt to address this problem, some light sources used for forensic examination come with a mechanical filter assembly, which allows the introduction of one of about a half dozen filters into the path of the light source to provide the desired wavelength illumination. While this does solve the problem of providing a convenient and easy way to use a light source, obsolescence and limited wavelength and bandwidth selection remain.

In an attempt to overcome some of these disadvantages earlier forensic illumination systems have attempted to achieve a measure of tunability by mounting an interference filter for angular rotation. Generally, such angular rotation results in a change in angle of incidence with respect to the filter input and a relatively small variation in the encountered path length between the functional layers in the interference filterfor light passing through the filter in a fixed direction. In accordance with Bragg's Law, this results in different wavelength filtering characteristics.

SUMMARY OF THE INVENTION

The invention, as claimed, is intended to provide a remedy. It solves the problem of how to provide a high intensity light source which is continuously adjustable to vary the center frequency of a band of wavelengths. At the same time, the bandwidth of this band is also continuously adjustable. The same is done with a single light source and a single filtering apparatus. At the same time the above is achieved with a mechanical configuration that is both reliable and rugged. Finally, the inventive system is easily portable, and is capable of outputing light sufficient for close up analysis of surfaces bearing such material as oils, semen, blood and so forth.

In accordance with the present invention, a method and apparatus for illuminating a deposition of organic material such as, blood, sweat or oil for forensic examination is provided. A light source emits light having a range of wavelengths. A first optical coupler is positioned and configured to reflect the light toward a reflective diffraction grating. A supportable structure supports at selectable relative position an exit slit and the grating to pass a desired band of wavelengths of output light from portions of the light reflected by the grating. A bendable second optical coupler is coupled to the exit slit and directs the output light toward the deposition to be examined. The bendable second optical coupler comprises a liquid fiber optic member. The support structure rotates the grating. An electronic control and a hand held remote control pad is coupled to the support structure and controls the support structure.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
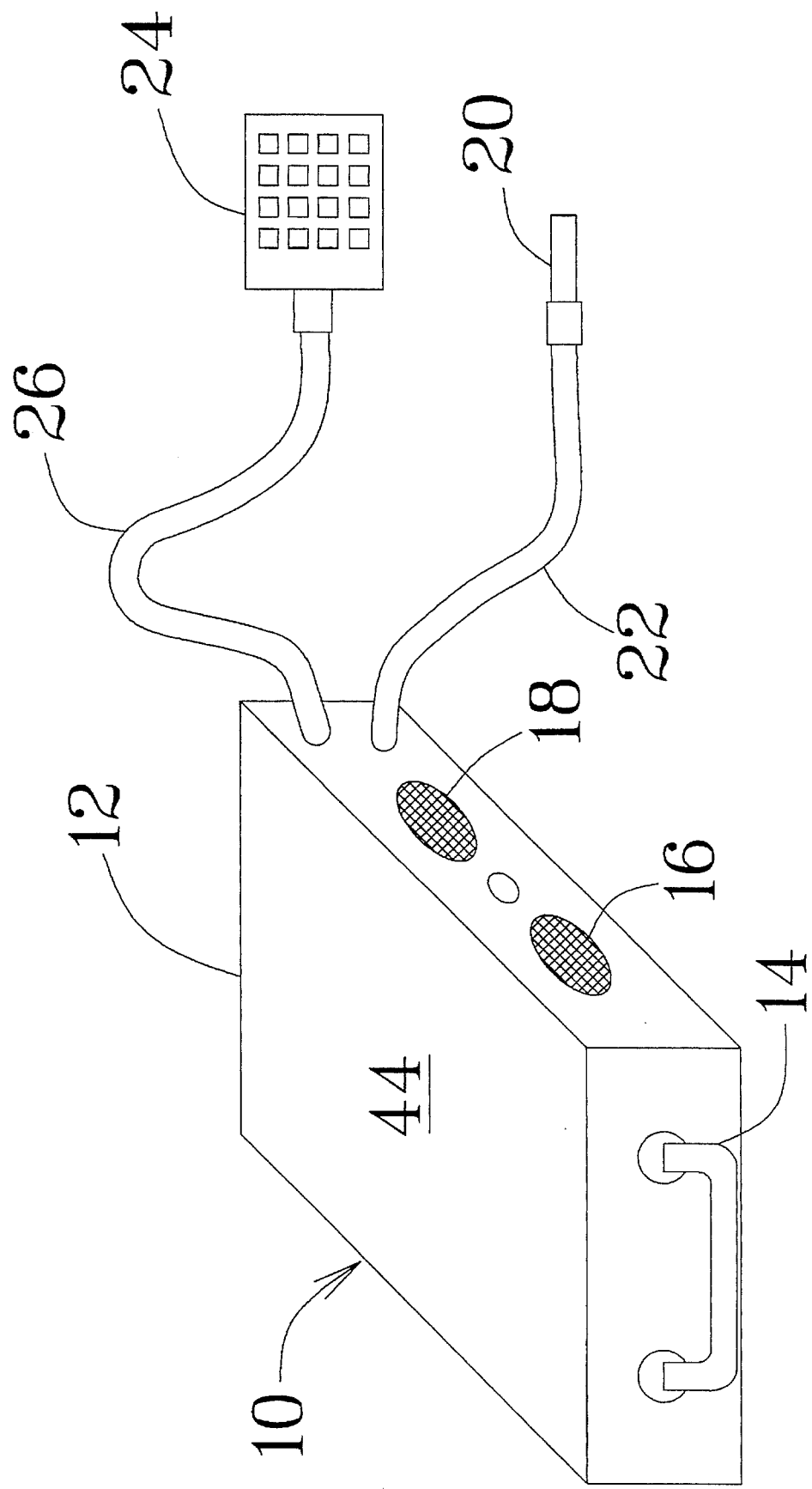
FIG. 1 is a perspective view of a forensic illumination system constructed in accordance with the present invention.

A forensic lighting system 10 constructed in accordance with the present invention is illustrated in FIG. 1. System 10 comprises a housing 12 and a carrying handle 14. Ventilation is provided by a pair of ventilation openings 16 and 18.

Figure 2:
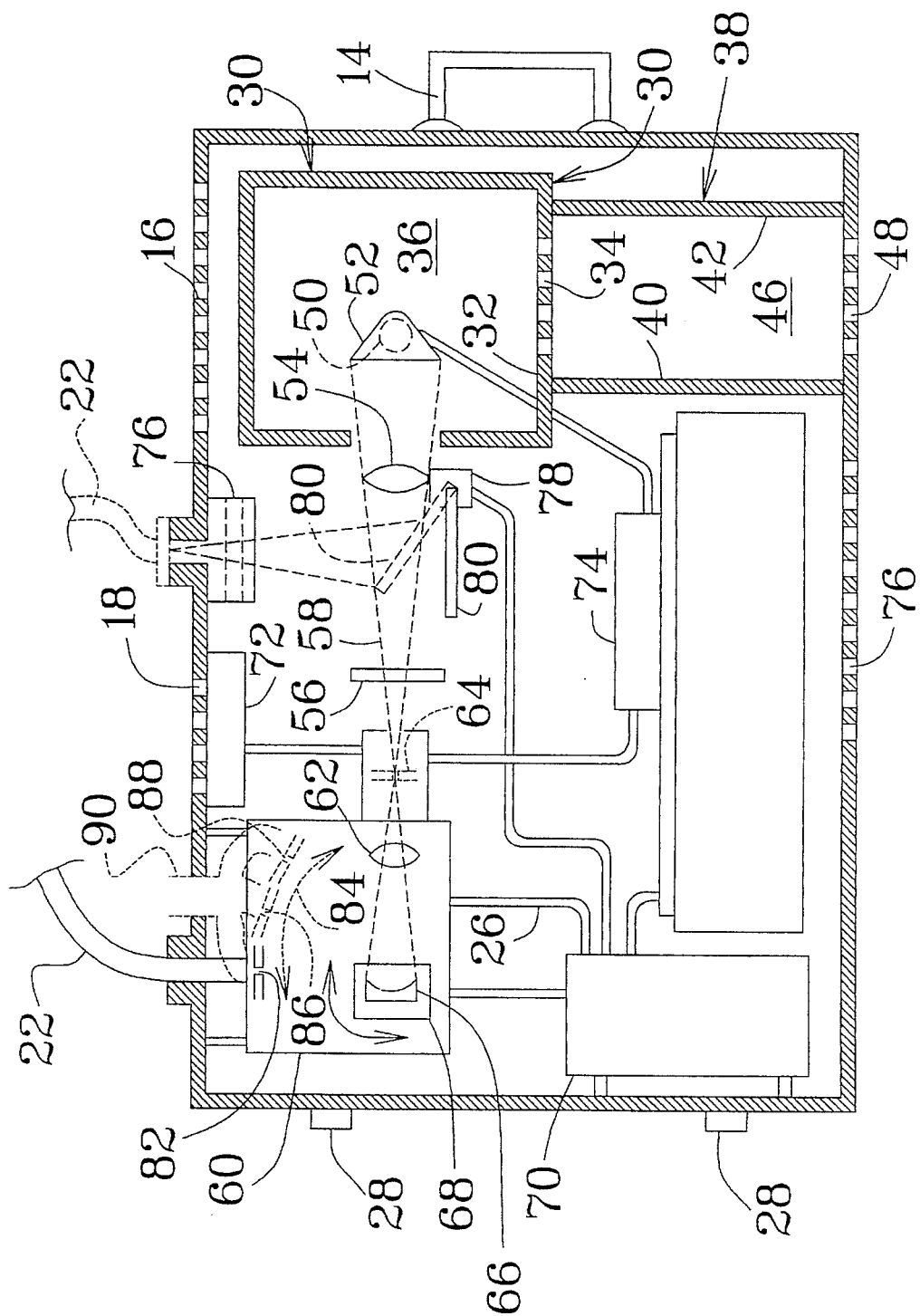
FIG. 2 is a view of the layout of the system illustrated in FIG. 1.

Light output from system 10 is provided to a light output head 20 at the end of a liquid fiber optic coupling cable 22. Manipulation of bandwidth and center wavelength is achieved through remote control 24 which is coupled to system 10 by a cable 26. As can be seen in FIG. 2, the housing, which takes the form of a briefcase and is easily portable, is completed by a plurality of rubber feet 28, which serve to support the inventive system 10 while it is in use resting on a floor, table or the like.

With continuing reference to FIG. 2, the system generally comprises a light source 30 which comprises an inner light source housing 32, which houses a lamp and reflector. Housing 32 is provided with ventilation openings 34. The chamber 36 defined by housing 32 communicates with the ambient through ventilation opening 34 and a conduit 38 which is formed by a pair of walls 40 and 42, together with the two large area side surfaces 44 and 46 of housing 12. Ambient air is admitted to conduit 38 by ventilation openings 48.

Light source 30 is designed around an electrical lamp 50. Lamp 50 is a conventional xenon short arc lamp of the type manufactured by I L C technology of, Sunnyvale, Calif. The light from lamp 50 is focused and concentrated by the combination of a reflector 52 and a lens 54.

If desired, a filter 56 may be introduced into the system to remove undesired wavelengths from the light output 58 of lamp 52. The advantage of filter 56 is to prevent excessive build up of heat in grating assembly 60. Light output 58 is, in turn, focused by a lens 62 after it passes through the entry slit 64 of grating assembly 60. It then falls on grating 66 which is mounted for rotation on a motor driven platform 68 which is responsive to a control circuit 70.

Air is circulated through the system by a fan 72 which expels air through openings 18. Fan 72 thus causes the introduction of air through openings 48, openings 34 and conduit 38 into light source housing 32. In addition, air is introduced through openings 16 to further cool the system. Finally, power supply 74 is cooled by air which enters through openings 76. Such cooling is important to maximize the life of the grating and lamps, and to a lesser extent, other components of system 10.

Figure 3:
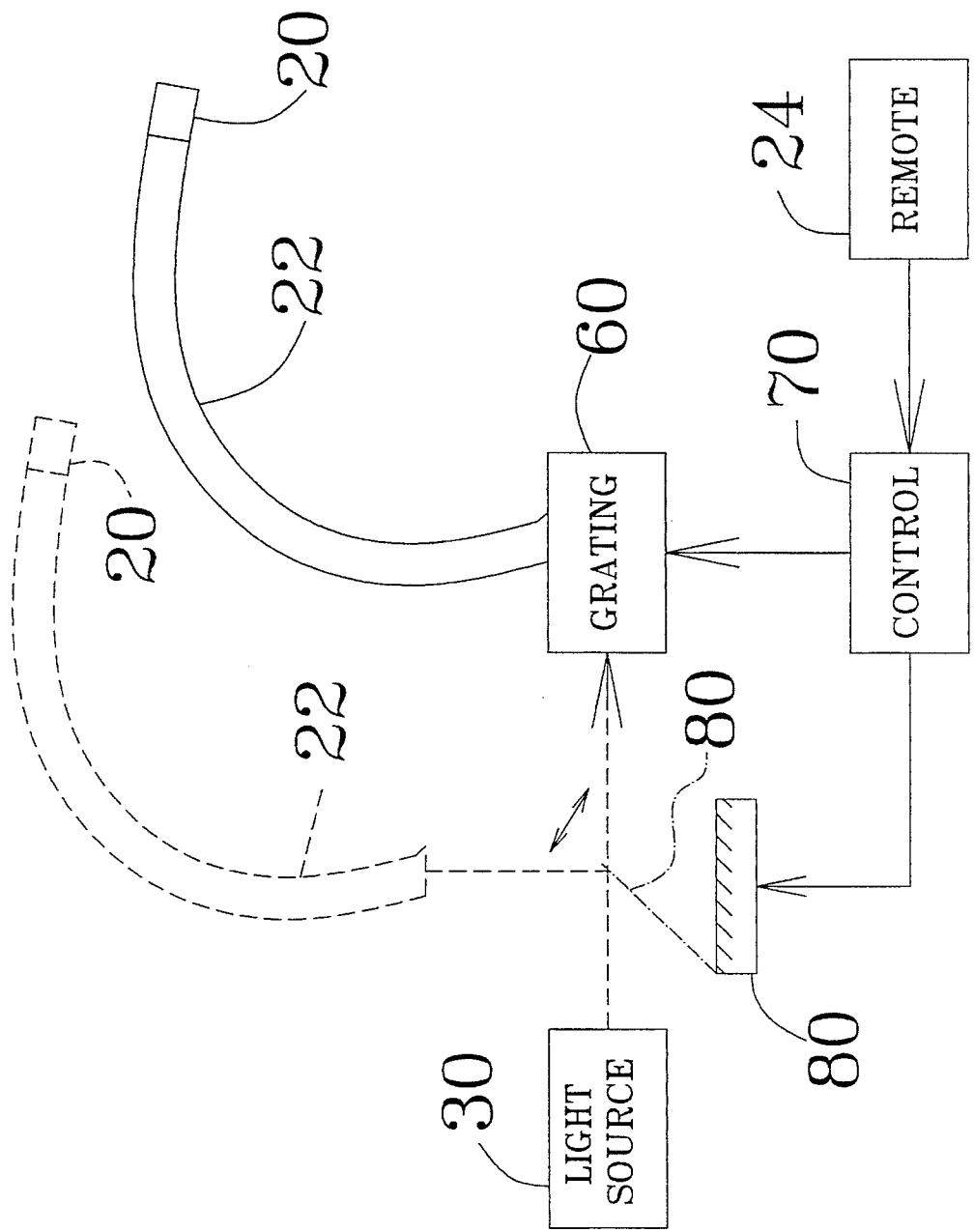
FIG. 3 is block diagram of the system illustrated in FIGS. 1 and 2.

In accordance with a preferred embodiment of the invention it is also possible for the output of lamp 50 to be sent through a conventional filter 56, through which it may be coupled to fiber optic cable 22 by movement of cable 22 from the position illustrated in solid lines in FIG. 2 to the position illustrated in phantom lines in FIG. 2. Diversion of light 58 is achieved by means of a motorized rotating platform 68 which rotates a mirror 80 into the position illustrated in phantom lines in FIG. 2 to direct the light in the desired direction. As may be understood with reference to FIG. 3, during operation, the user manipulates a remote control 24 which drives control circuit 70 to provide control signal for rotation of platform 68. This results in wavelength selection insofar as the angular position of platform 68 determines which wavelengths pass through exit slit 82.

As noted above, planar mirror 80 may also be interposed into the path of light 58 to the position illustrated in phantom lines in FIG. 2, resulting in the coupling of light to an auxiliary port to which cable 22 may be transferred, thus resulting in a conventional filtered light source. The wavelengths passed by the system would then be a function of the characteristics of filter 76.

Considering operation of the system with the grating, if it is desired to vary the bandwidth of the wavelengths of light passed by grating assembly 60, it is merely necessary that the width of exit slit 82 be adjusted wider for a wider bandwidth or narrower for extremely selective narrow bandwidth operation. As can be seen from the above, grating 66 provides for continuous selection of any wavelength desired insofar as the angle of reflection of light from the surface of grating 66 is a function of the angle of incidence of the light and the wavelength of the light involved. Thus, continuous selection of bandwidth through the variation of the width of slit 82 is also possible.

In accordance with an alternative embodiment of the invention, it is also possible to move exit slit 82 along the focal surface 84 of grating 66. In such an arrangement, one may also have a plurality of additional exit slits, for example exit slits 86 and 88 which would also move along surface 84 and send their outputs to optical combiner 90. In accordance with this embodiment, maximum use may be made of those wavelengths of light which are of interest to the user and which are produced by lamp 50.

As noted above, planar mirror 80 may also be interposed into the path of light 58 to the position illustrated in phantom lines in FIG. 2, resulting in the coupling of light to an auxiliary port to which cable 22 may be transferred, thus resulting in a conventional filtered light source. The wavelengths passed by the system would then be a function of the characteristics of filter 76.

Figure 4:
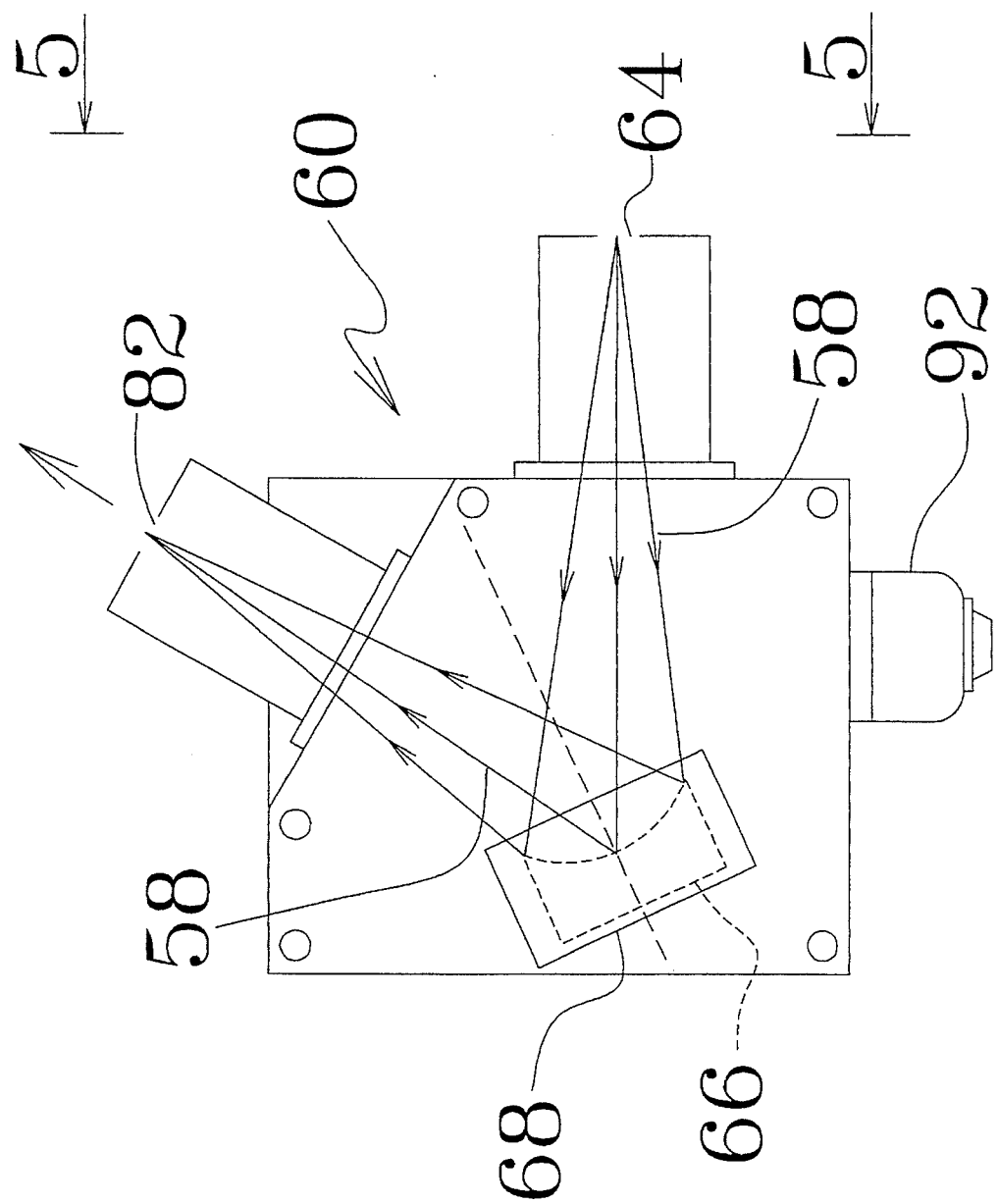
FIG. 4 is a schematic illustration of a preferred monochromator section for incorporation into the embodiment of FIGS. 1–3.
Figure 5:
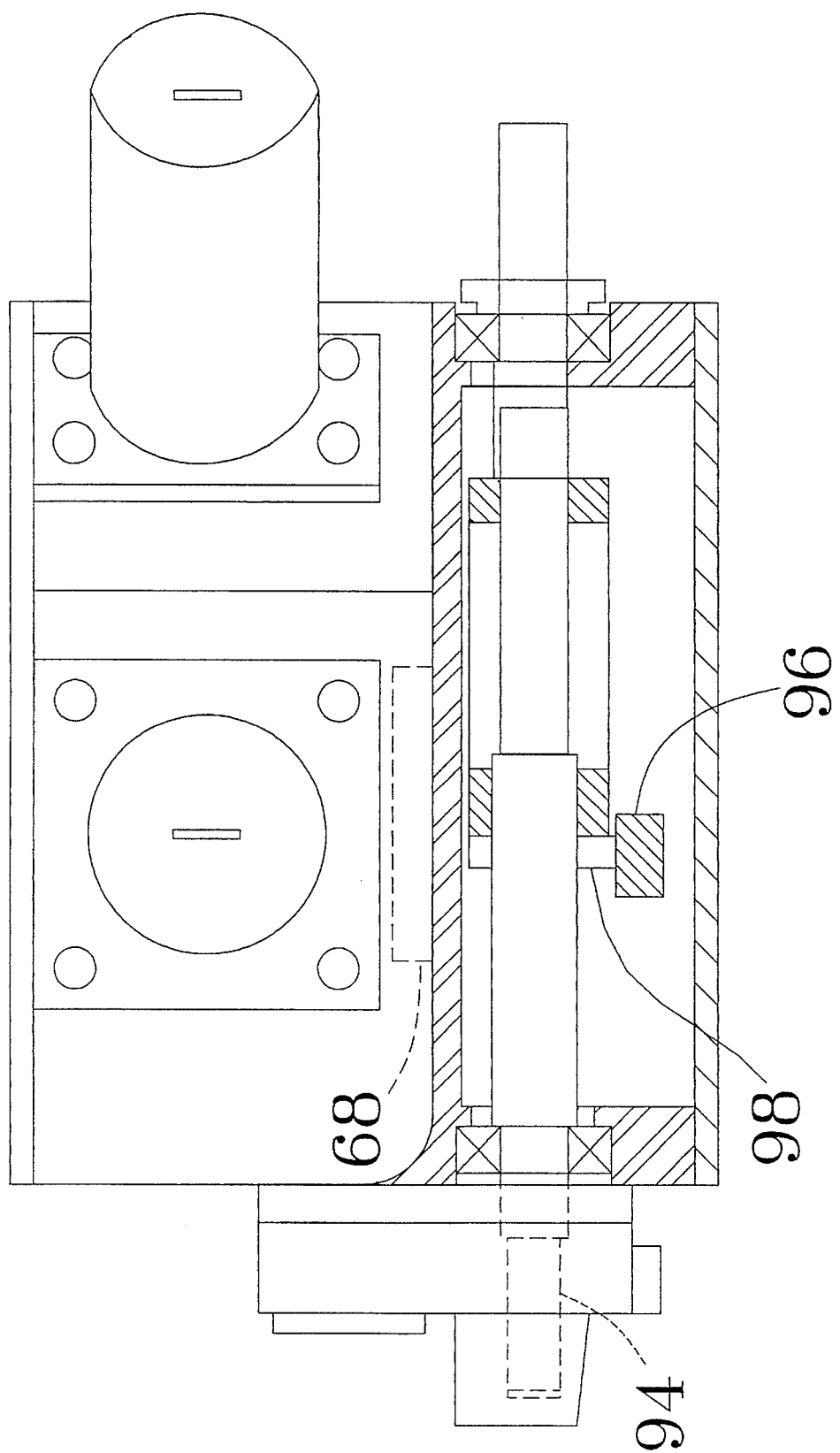
FIG. 5 is a view along lines 5—5 of the monochromator section of FIG. 4.

FIGS. 4 and 5 illustrate a preferred embodiment for the grating assembly 60. Generally, this grating assembly forms a monochromator having an entry slit 64 and an exit slit 82.

The grating 66 is mounted for rotation within its housing as discussed above. Rotation is provided by motor 92, which has a output drive shaft 94 which is coupled to reduction gear assembly 96, which drives output shaft 98. Output shaft 98, in turn, is coupled to the rotating platform 68 for angular rotation of platform 68.

In particular, still yet another possibilty is to use a sinnsoidally varied drive system for rotation of the grating. The same can be achieved by replacing the monochromator illustrated in FIGS. 4 and 5 with a monochromator of the type disclosed in U.S. patent application Ser. No. 516,784, filed on Apr. 30, 1990 naming Slutter et al as inventors and entitled Improved Czerny-Turner Monochromator, now U.S. Pat. No. 5,192,981. The specification of this patent application is incorporated herein by reference.

Figure 6:
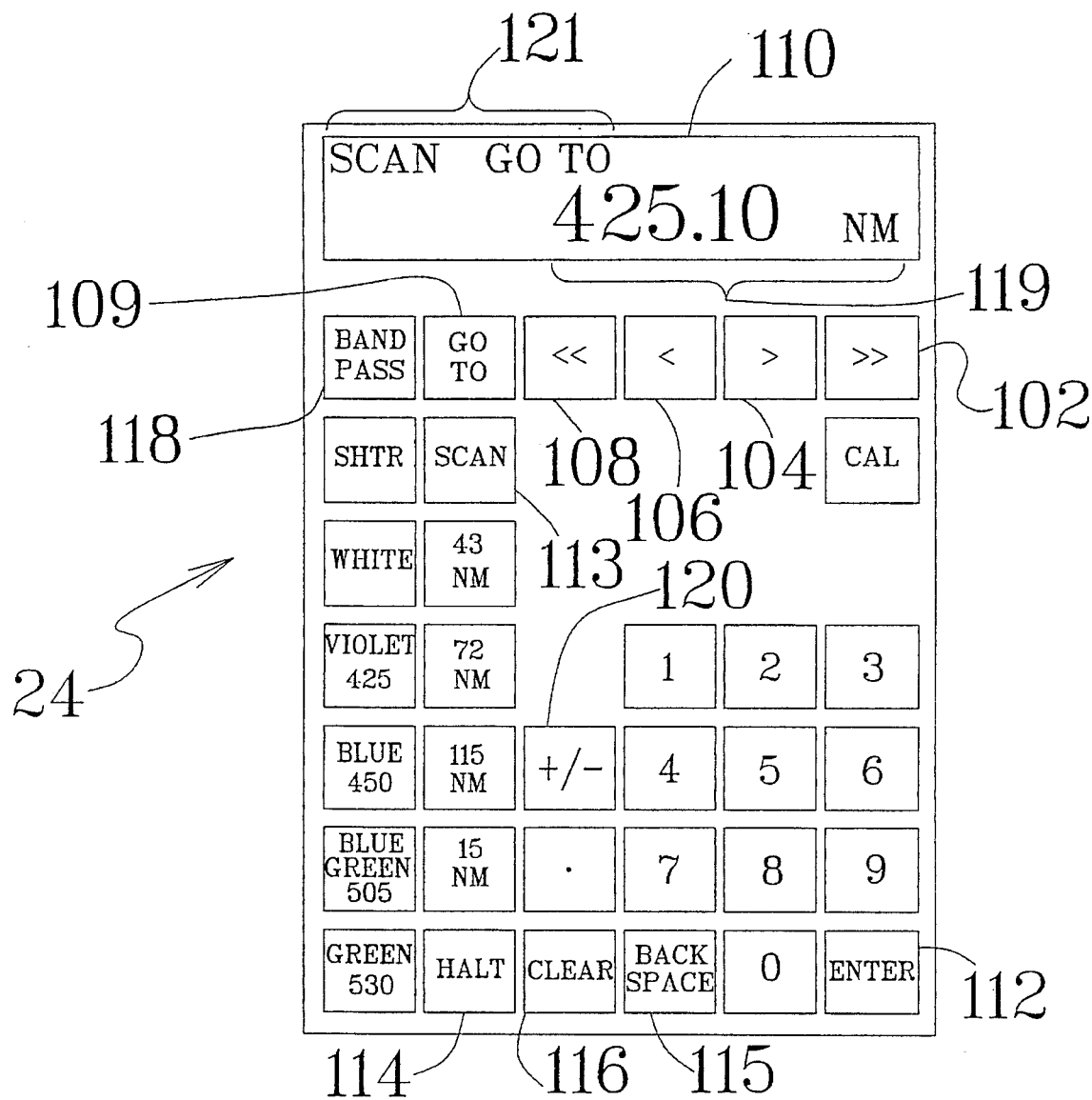
FIG. 6 is a plan view of a remote control for the inventive system.

Referring to FIG. 6, ease of operation is provided by the particular arrangement of the remote control 24. Generally remote control 24 has a number of input buttons which may be used to directly select the wavelength desired. In addition, displayed wavelength may be varied quickly in the upward direction by button 102 or slowly in the upward direction by button 104. Likewise wavelength may be varied downwardly by button 106 with relatively fine and slow movement. Quick downward display variation is achieved through button 108.

In order for the system 10 to know that the variation selected by the buttons is to be applied to the wavelength, one first pushes the "go to" button 109, causing the wavelength to which the system is tuned at that time to appear on liquid crystal display 110. When the desired wavelength is displayed on the screen, the enter button 112 is pressed causing the system to move the grating to the desired output wavelength. The previous wavelength may be reobtained by pushing the back space button.

If one wishes to preform a scanning operation by continually varying the output wavelength, the scan button 113 is pushed. During scanning, the halt button 114 will stop the scanning and the back space button 115 will allow reacquisition of a point previously passed.

Entries in the "go to" mode may be nullified by the clear button 116. Alternatively, if one wishes to vary the passband, buttons 102–108 are used after pressing of the bandpass button 118. In this case, display 110 will exhibit in display portion 119 the bandpass in nanometers. If desired the "±" button 120 may be used to change the backspace function during scan to a forward space function. The function under use is displayed in display portion 121.

For ease of operation, a number of preselections of wavelengths commonly used in forensic applications are provided, including, green (530 nm), blue-green (505 nm), blue (450 nm), violet (425 nm), white light and 43 nm, 72 nm, 115 nm and 15 nm in the ultraviolet range. While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. Apparatus for illuminating a deposition of material for forensic examination, comprising:

(a) a light source emitting light having a range of wavelengths;

(b) a reflective diffraction grating;

(c) a first optical coupler, coupled to said light source, positioned and configured to couple said light to said reflective diffraction grating;

(d) an exit slit, said light moving along an optical path extending from said light source to said grating and to said exit slit;

(e) support structure supporting said optical coupler, said grating and said exit slit at selectable relative positions to pass a desired band of wavelengths of output light from portions of said light reflected by said grating;

(f) an additional remote exit slit including structure for receiving an output filter; and (g) a mirror mounted for movement into and out of said optical path to selectively direct said light through said remote exit slit instead of allowing it to fall on said grating.

2. Apparatus as in claim 1, further comprising a bendable second optical coupler coupled to said exit slit and directing said output light of a predetermined wavelength toward said deposition to be examined, wherein said bendable second optical coupler comprises a fiber optic bundle.

3. Apparatus as in claim 1, further comprising a bendable second optical coupler coupled to said exit slit and directing said output light of a predetermined wavelength toward said deposition to be examined, wherein said bendable second optical coupler comprises a liquid optic member.

4. Apparatus as in claim 1, wherein said support structure rotates said grating to vary the bandwidth of the output light.

5. Apparatus as in claim 1, further comprising an electronic control and a hand held remote control pad coupled to said support structure and rotating said support structure and said diffraction grating.

6. Apparatus as in claim 5, wherein said remote control pad has a number of preset wavelength selections.

7. Apparatus as in claim 1, wherein said exit slit may be varied in width and position to provide a number of different bandpass widths for use in forensic examination.

8. Apparatus as in claim 1, further comprising a fan for cooling said apparatus, said fan utilizing intake openings at opposite sides of said support structure and thus utilizing cross ventilation for preventing overheating of said grating by passing a current of air substantially confined to said light source rendering said grating isolated from external contaminants which may be carried by said current of air.

9. A method of illuminating a forensic deposition of material abraded, imprinted, or cast off by a human agency onto a surface not selected by the implementer of said method of illumination, said method for forensic examination, comprising the steps of:

(a) generating light having a wide range of wavelengths;

(b) directing said light toward a rotatably mounted reflective diffraction grating;

(c) adjusting the relative position between an exit slit and said grating to result in passage of a desired band of wavelengths of output light from portions of said light reflected by said grating;

(d) redirecting said light with a mirror mounted for movement into and out of the path of said light path and selectively directing said light through an additional remote exit slit including a structure for receiving an output filter instead of allowing it to fall on said grating;

(e) directing said output light toward an area where said deposition is likely to be formed to be examined;

(f) searching a crime scene for evidence by successively directing said light to other areas where there are possible depositions; and (g) examining said areas under said light reflected by said grating.

* * * * *